US006975373B2

(12) United States Patent
Il

(10) Patent No.: US 6,975,373 B2
(45) Date of Patent: Dec. 13, 2005

(54) COLOR FILTER AND LIQUID CRYSTAL DISPLAY DEVICE USING IT, AND MANUFACTURING METHOD THEREOF

(75) Inventor: Miho Il, Kakogawa (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/480,662

(22) PCT Filed: Jun. 20, 2002

(86) PCT No.: PCT/IB02/02401

§ 371 (c)(1),
(2), (4) Date: Dec. 12, 2003

(87) PCT Pub. No.: WO03/003075

PCT Pub. Date: Jan. 9, 2003

(65) Prior Publication Data
US 2004/0169796 A1 Sep. 2, 2004

(30) Foreign Application Priority Data
Jun. 29, 2001 (JP) .............................. 2001-198661
Dec. 12, 2001 (JP) .............................. 2001-379061

(51) Int. Cl.⁷ .......................................... G02F 1/1335

(52) U.S. Cl. ..................................... 349/106; 349/114

(58) Field of Search ...................... 349/114, 106–109

(56) References Cited

U.S. PATENT DOCUMENTS 5,684,552 A * 11/1997 Miyamoto et al. .......... 349/106
6,322,936 B1 * 11/2001 Nishikawa et al. ............ 430/7
6,476,889 B2 * 11/2002 Urabe et al. ................ 349/106

FOREIGN PATENT DOCUMENTS

JP        2000-330106        11/2000

OTHER PUBLICATIONS

"Development of Advanced TFT with Good Legibility under Any Intensity of Ambient Light" by M. Kubo et al., IDW 99, Proceedings of the Sixth International Display Workshops, AMD3-4, pp. 183-186, Dec. 1, 1999, sponsored by ITE and SID.

* cited by examiner

Primary Examiner—Dung T. Nguyen

(57) ABSTRACT

An object of the invention is to provide a color filter and a liquid crystal display device using it, which can acquire uniform color purity within a pixel. A color filter for coloring the first light ray L1 having a unidirectional optical path and the second light ray L2 having a bidirectional optical path for each pixel. This filter comprises: a step-forming layer of optically transmissive material, which can be supported by a base layer 20, and which is patterned for a pixel to form at least one recess-shaped portion having a bottom face 3b of a predetermined shape corresponding to an area wherein the first light ray L1 is caused to be transmitted and a wall face 3w of a predetermined height; and a coloring layer 1C deposited on the step-forming layer 30 and the recess-shaped portion for coloring the first and second light rays.

21 Claims, 6 Drawing Sheets

COLOR FILTER AND LIQUID CRYSTAL DISPLAY DEVICE USING IT, AND MANUFACTURING METHOD THEREOF

BACKGROUND OF THE INVENTION

1. Field of the Invention

The present invention relates to a color filter. The present invention also relates to a liquid crystal display device employing a color filter.

In particular, the present invention relates to a color filter which handles a first light ray and a second light ray. The first light ray has such a unidirectional optical path that the light ray incident from one principal plane side of the filter passes through the filter only once to be colored and is guided to the other principal plane side of the filter. The second light ray has such a bi-directional optical path that the light ray incident from the other principal plane side of the color filter passes through the filter to be colored and the passed light ray is reflected by an optical reflective element or the like disposed in the one principal plane side to enter the filter again and pass to be colored, and comes back to the other principle plane side. The invention also relates to a method of manufacturing the color filter. The invention further relates to a liquid crystal display device using such a color filter, and to a method of manufacturing the liquid crystal display device.

2. Description of Related Art

A liquid crystal display device, what is called the transflective type liquid crystal display device, becomes in full practical use, wherein external light incident from the front side is reflected to be guided to the front side while being provided with an optical modulation according to the image to be displayed, and incident light from the back light system on the rear side is passed to the same front side while being likewise provided with the optical modulation according to the image to be displayed. This type of liquid crystal display device effectively performs displays of image based on the external light (ambient light) mainly when the operating environment is bright (reflective mode) and based on emission light from the back light system mainly when it is dark (transmissive mode).

Such a type of liquid crystal display device is disclosed in a prior art document, "Development of Advanced TFT with Good Legibility under Any Intensity of Ambient Light" by M. Kubo et al., IDW' 99, Proceedings of The Sixth International Display Workshops, AMD3–4, page 183–186, Dec. 1, 1999, sponsored by ITE and SID. In this device, each pixel electrode is divided into a reflection area and a transmission area. The reflection area is a reflection electrode part formed from aluminium with which an acrylic resin with a rough surface is covered, and the transmission area is a transparent electrode part formed from ITO (Indium Tin Oxide) with a flat surface. The transmission area is situated in the center of a rectangular pixel area and has a substantially similar rectangular figure like the pixel area, whereas the reflection area is a part of the pixel area other than the rectangular transmission area and has a form of surrounding the transmission area. By virtue of the pixel configuration etc, the legibility is improved.

SUMMARY OF THE INVENTION

However, in the prior art liquid crystal display device, the transmission area and the reflection area are different in color purity of the displayed color although these areas are in the same pixel area. It is supposed that this problem results from the color filter in the prior art in which the light from the back-light system and the external light whose optical paths are different from each other are colored in much the same fashion. As a result, the quality of the displayed colors is deteriorated over the display area.

In view of the above-mentioned points, it is an object of the present invention to provide a color filter and a liquid crystal display device using the color filter, which can show more uniform color purity within a pixel.

It is another object of the present invention to provide a color filter and a liquid crystal display device using the color filter, which can satisfactorily reproduce chromaticity over a display area.

It is a further object of the present invention to provide methods of manufacturing the color filter and the liquid crystal display device.

In order to achieve the above-described objects, a color filter according to one aspect of the present invention is a color filter for coloring a first light ray having a unidirectional optical path and a second light ray having a bidirectional optical path for each pixel, comprising: a first coloring portion for coloring the first light ray and a second coloring portion for coloring the second light ray, the first and second coloring portions differeing in thickness, or is, in further development, a color filter for coloring a first light ray having a unidirectional optical path and a second light ray having a bidirectional optical path for each pixel, comprising: a step-forming layer of optically transmissive material, which can be supported by a base layer, and which is patterned for a pixel to form at least one recess-shaped portion having a bottom face of a predetermined shape corresponding to an area wherein the first light ray is caused to be transmitted and a wall face of a predetermined height; and a coloring layer deposited on the step-forming layer and the recess-shaped portion for coloring the first and second light rays.

According to this aspect, a thickness of the coloring layer's portion (the first coloring portion) corresponding to the bottom face may be greater than that of the remainder (the second coloring portion) of the coloring layer. This leads to the following effects and advantages. That is, on the one hand, the first light ray, which follows a unidirectional optical path and which thus has only one opportunity to be colored, can undergo a relatively high degree of coloring effect, and the other hand, the second light ray, which follows a bi-directional optical path and which thus has two opportunities to be colored, can undergo a relatively low degree of coloring effect. Accordingly, it is possible to reproduce the corresponding colors in more uniform color purity within a pixel for the first and second light rays, thereby improving the quality of a color-displaying over an entire area of the display screen.

In this aspect, the coloring layer's portion corresponding to the bottom face may have a thickness substantially two times larger than that of the remainder of the coloring layer. This construction allows a light ray incident on the color filter to be much uniformly colored.

In addition, the step-forming layer may be colorless and transparent. This manner makes it possible to form a step (or difference of level) in a surface on which the coloring layer is to be deposited without affecting the coloring effects caused by the coloring layer.

Moreover, the step-forming layer may be formed from a synthetic resin. This allows the step-forming layer to be formed from ordinary materials.

Also in the aspect, preferably the color filter may further comprise a flattening layer of optically transmissive material which is deposited on at least an area corresponding to the bottom face on the coloring layer. Thus, a recess of the coloring layer possibly formed by the bottom face and the step is filled with the optically-transmissive material for the flattening layer, and as a result an entire surface of the color filter is flattened. Accordingly, planes of incidence of light are uniformalized over the color filter's surface to suppress an unexpected light leakage resulting from the recess, thereby greatly contributing to improvement of the optical performance for the coloring effect. In addition, even in the case where a further layer is provided on the color filter, the further layer never comes into direct contact with the coloring layer because of existence of the flattening layer. For instance, contamination of liquid crystal layer can be avoided. Furthermore, the flattened surface of the color filter can prevent alignment disorder (irregularity) of the alignment layer and the liquid crystal layer disposed on and above the color filter, respectively.

The flattening layer in this manner may be colorless and transparent. This leads not to affect the coloring performance of the coloring layer while keeping the above-described effects and advantages.

Furthermore, the flattening layer may be formed from a synthetic resin. This achieves an advantage of being able to add the flattening layer based on an ordinary and inexpensive material.

Also in this aspect, the first coloring portion or the bottom face may have at least in part a rounded shape on a plan view. And the first coloring portion or the bottom face may have substantially a circle shape on a plan view. Alternatively, the first coloring portion or the bottom face may have substantially a shape of polygon that is enclosed with 5 or more line segments on a plan view. Thus, the recess-shaped portion of the step-forming layer is formed, instead of simple rectangle shape, in such a shape that represents a polygon having greater interior angles or includes a curving line having a large radius of curvature as an outline thereof. This is advantageous with regard to forming the desired pattern accurately.

The step-forming layer may include an optically transmissive base material and multiple particles of optically transmissive material having a refractive index different from a refractive index of the base material and being scatteringly mixed into the base material, and the base material and particles may consist of synthetic resins. This manner has advantages that the step-forming layer has an optically diffusing (scattering) ability and therefore only the second light ray can be selectively diffused. Accordingly, the manner reduces the need for making the other components to have an optical diffusing ability for the second light ray, and can exert the suitable diffusion effect for the second light ray in the refection mode, independent of diffusion for the first light ray.

In order to achieve the above-described objects, a liquid crystal display device according to another aspect of the present invention employs any color filter according to the above-mentioned aspect.

This aspect may be characterized in that: the color filter is provided to one substrate of the liquid crystal display device; the other substrate is provided with a pixel electrode comprising a transmissive electrode part for making the first light ray to be transmitted therethrough and a reflective electrode part for making the second light ray to be reflected therefrom; and the first coloring portion or an area of the bottom face in the color filter is aligned with the transmissive electrode part and the other area in the color filter is aligned with the reflective electrode part.

The above-described liquid crystal display device is able to realize uniform color purity within each pixel, thereby obtaining high quality color images for display.

Furthermore, in order to achieve the above-described objects, a method of manufacturing a color filter according to a further aspect of the present invention is a method of manufacturing a color filter for coloring a first light ray having a unidirectional optical path and a second light ray having a bidirectional optical path for each pixel, comprising the steps of: depositing an optically transmissive material on a base layer; patterning the deposited layer of optically transmissive material to form a step-forming layer wherein at least one recess-shaped portion is formed for a pixel, the recess-shaped portion having a bottom face of a predetermined shape corresponding to an area wherein the first light ray is caused to be transmitted and a wall face of a predetermined height; and depositing a material for coloring the first and second light rays on the step-forming layer and the recess-shaped portion so as to form a coloring layer.

Accordingly, the color filter, which can make the previously-described effects and advantages, can be manufactured in a relatively simple manner.

In this aspect, the method may further comprise the step of depositing an optically transmissive material on at least an area corresponding to the bottom face on the coloring layer so as to form a flattening layer. Accordingly, it is possible to manufacture the color filter capable of acquiring the above-described advantages relating to the flattening layer.

Moreover, in order to achieve the above-described objects, a method of manufacturing a liquid crystal display device according to yet further aspect of the present invention is a method of manufacturing a liquid crystal display device, comprising the steps included in the manufacturing method for a color filter as mentioned above, wherein the color filter is provided to one substrate of the liquid crystal display device and the other substrate is provided with a pixel electrode comprising a transmissive electrode part for making the first light ray to be transmitted therethrough and a reflective electrode part for making the second light ray to be reflected therefrom, the display device manufacturing method further comprising the step of aligning an area of the bottom face in the color filter with the transmissive electrode part and aligning the other area in the color filter with the reflective electrode part.

According to this method, it is possible to give on-target directions to manufacture of a liquid crystal display device which can much satisfactorily use the advantages of the above-described color filters.

DESCRIPTION OF THE PREFERRED EMBODIMENT(S)

Now the above-mentioned aspects and other aspects according to the present invention will be described in more detail with reference to the accompanying drawings.

[Embodiment 1]

Figure 1:
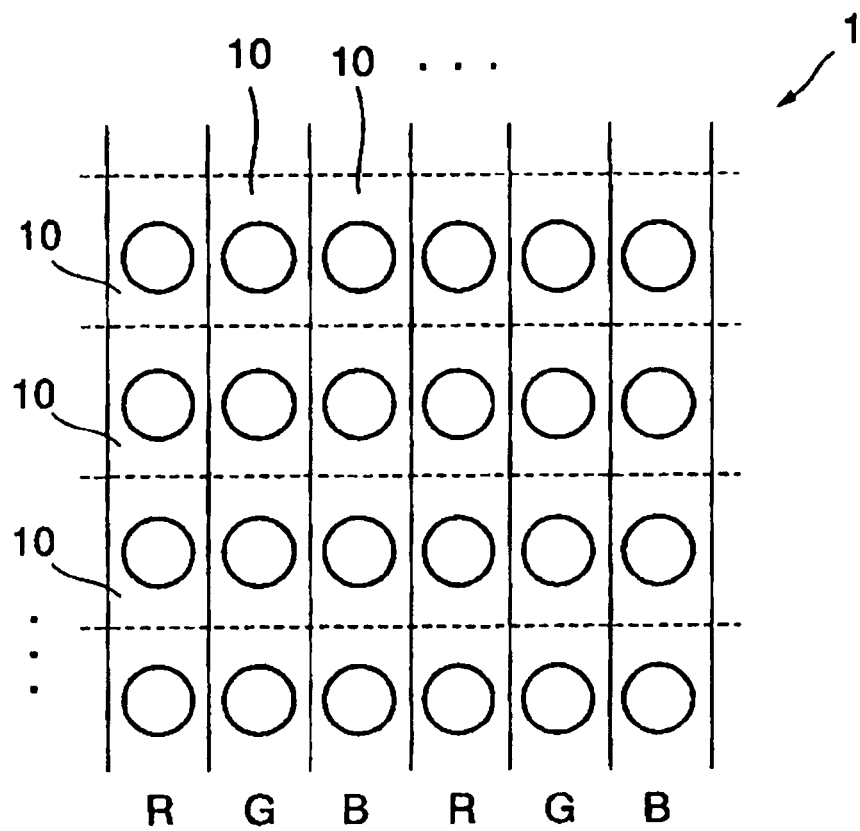
FIG. 1 is a general plan view of a color filter employed in a liquid crystal display device according to the first embodiment of the present invention.

FIG. 1 illustrates a general plan view of a color filter 1 employed in a liquid crystal display device of a first embodiment according to the present invention.

The color filter 1 is partitioned into longitudinal coloring areas each of which extends in a vertical direction of a display screen, and which have coloring matters of red (R), green (G) and blue (B), respectively. These longitudinal coloring areas are cyclically arranged in order of R, G and B in a horizontal direction on the display screen. One longitudinal coloring areas may be further divided in a vertical direction, and each of the divisional portions corresponds to a pixel. The divisional portion will be referred to as a pixel area part 10 hereinafter. It is noted that although the longitudinal coloring areas are partitioned in a vertical direction by dashed lines as shown in FIG. 1, the pixel area parts 10 (the pixel area parts 10 vertically aligned) of one longitudinal coloring area are neither isolated materially nor physically in the embodiment. The dashed lines just indicate boundaries of pixels.

Figure 2:
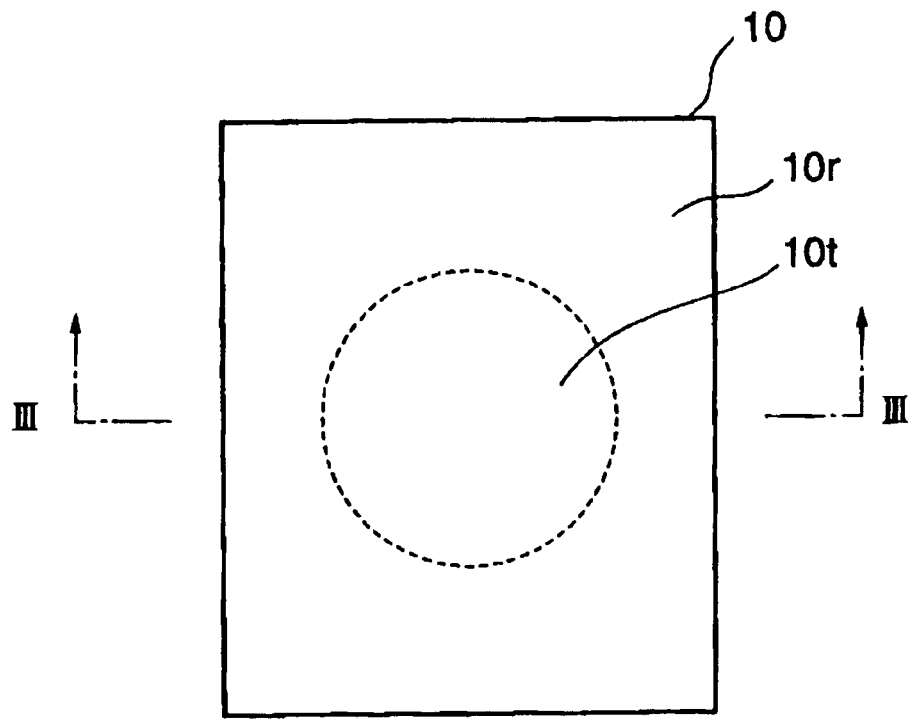
FIG. 2 is a general and enlarged plan view of sub-regions of a color filter for a pixel of FIG. 1.
Figure 3:
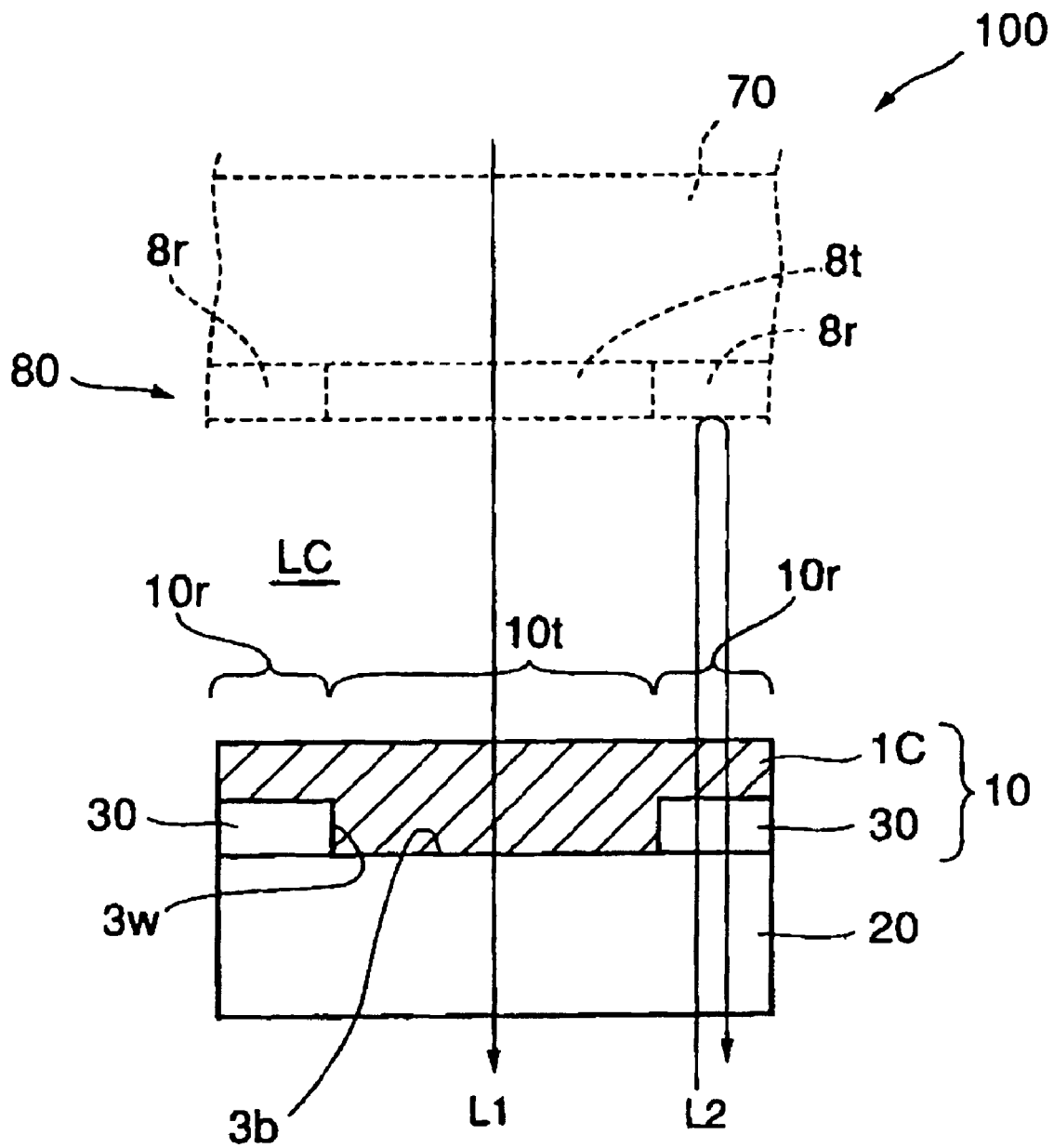
FIG. 3 is a general cross sectional view of a color filter incorporated within a liquid crystal panel, taken along the line III—III of FIG. 2.

FIG. 2 illustrates a general enlarged plan view of one pixel area part 10, and FIG. 3 illustrates a cross sectional view of a color filter incorporated into a liquid crystal display panel 100, taken along the line III—III of FIG. 2. It should be noted that FIG. 3 illustrates a basic construction of a liquid crystal display panel, and therefore, in order to simplify the description, minor layers, films and structures thereof are omitted.

The pixel area part 10 is partitioned into a first region 10$t$ for a transmitted light ray L1 as a first light ray, a second region 10$r$ for a reflected light ray L2 as a second light ray. The first region 10$t$ and the second region 10$r$ respectively correspond to and are aligned with a transmissive region (transmissive electrode part) 8$t$ and a reflective region (reflective electrode part) 8$r$, the transmissive and reflective regions being formed in a pixel electrode 80 provided on a substrate 70 which is disposed facing the first and second regions via a liquid crystal layer LC.

The first region 10$t$ is formed substantially shaped like a circle whose center is positioned in the center of the pixel area, and the second region 10$r$ is in a form that is a part except the region 10$t$ and surrounds the region 10$t$. Therefore, it is assumed in the embodiment that electrode parts formed in the pixel electrode 80 are also shaped substantially equal to those of the regions 10$t$ and 10$r$ in a plan view, respectively.

As shown in FIG. 3, the pixel area part 10 comprises: a transparent resin layer 30 as a step forming layer formed on a front side transparent substrate 20 of the liquid crystal display panel 100 and formed inside the panel; and a coloring layer 1C formed on and covering the transparent substrate 20 and the transparent resin layer 30.

The transparent resin layer 30 is patterned to have a shape of the second region 10$r$, shown in the plan view. In more detail, the transparent resin layer 30 can be supported by the substrate 20 and is patterned within a pixel (area) to have a recess-shaped portion comprising a predetermined shape of bottom surface 3$b$ corresponding to a region for allowing a transmitted light ray L1 to pass therethrough and a wall surface 3$w$ having a predetermined height to thereby form a step on a surface on which the coloring layer 1C is to be deposited.

In the embodiment, only a part of the transparent resin material corresponding to the first region 10$t$ is removed so that an opening (or window) for the transparent substrate 20 is formed in an area of the part. The coloring layer 1C has the first region 10$t$ on the opening and the second region 10$r$ on the remainder part thereof, in more detail, on a portion of the transparent resin layer 30 having been patterned. Therefore, as could be clearly understood by referring to the figure, a part (first coloring portion) of the coloring layer 1C corresponding to the first region 10$t$ is formed thicker than a part (second coloring portion) of the coloring layer 1C corresponding to the second region 10$r$.

It is preferable that the part of the coloring layer 1C corresponding to the first region 10$t$ is made approximately two times the part of the coloring layer 1C corresponding to the second region 10$r$ for the following reasons.

For example, after a light ray L1 from a backlight system passes through a transparent electrode part 8$t$ and a liquid crystal layer LC, it is colored by a portion of the coloring layer 1C corresponding to the first region 10$t$ while being guided to an exterior on the front face side of the panel. On the other hand, an external light ray L2 from the front face side of the panel passes though the transparent substrate 20 and the transparent resin layer 30, and is once colored by a portion of the coloring layer 1C corresponding to the second region 10$r$ and then reaches the reflective electrode part 8$r$ through the liquid crystal layer LC while it is colored again through the portion of the coloring layer 1C corresponding to the second region 10$r$ after it is reflected the reflective electrode part 8$r$ and returns to the portion. Thereafter, the external (colored) light ray passes through the transparent resin layer 30 and the transparent substrate 20 to be directed to the exterior of the front face side of the panel.

As described above, since the first part of the coloring layer in the first region 10$t$ is thicker than the second part of the coloring layer in the second region 10$r$, it causes the transmitted light ray L1 to be subjected to relatively great coloring effect even if the transmitted light ray is transmitted through the first part only one time. On the other hand, since the coloring layer portion of the second region 10$r$ is thinner than coloring layer portion of the first region lot, it can not exert the same degree of coloring effect as the first region 10$t$ exerts. However, since the reflected light ray L2 is transmitted two times through the coloring layer portion of the second region 10$r$, the light ray L2 is subjected to double coloring effect. Therefore, it is sufficed to have such a thickness of the coloring layer portion of the second region 10$r$ that the reflected light ray L2 can undergo a sufficient degree of coloring effect when the light ray L2 is transmitted two times through the coloring layer portion of the second region 10$r$. Actually, the coloring layer portion of the second region 10$r$ should be made thinner than the coloring layer portion of the first region 10$t$ in consideration of a balance between coloring effects exerted by the coloring layer portions of the first and second regions 10$t$ and 10$r$.

Thus, the transmitted light ray L1 and the reflected light ray L2 appearing in the outside of the front side of the panel are uniformly colored so that good color reproduction characteristics are obtained within a pixel and over an entire area of the display screen.

[Embodiment 2]

Figure 4:
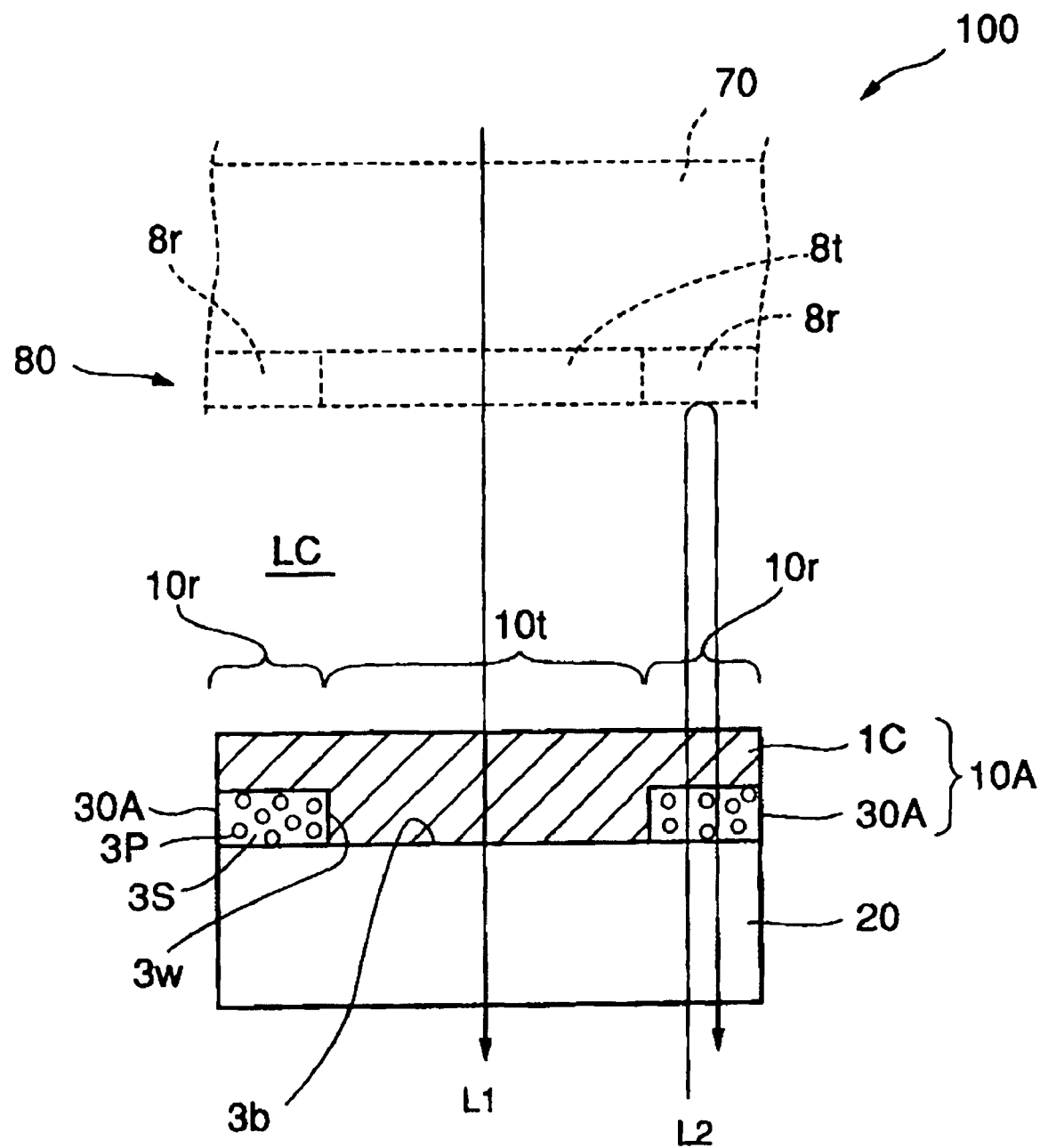
FIG. 4 is a general cross sectional view of a color filter according to the second embodiment of the present invention.

A second embodiment that is more advanced than the above-described embodiment is shown in FIG. 4.

A pixel area part 10A of a color filter in FIG. 4 comprises a layer 30A as a step-forming layer which includes an optically transmissive base material (or matrix material) 3S and a large number of optically transmissive particles 3P having a refractive index different from that of the base material and being scatteredly added to the base material. The other structural features are the same as those of FIG. 3.

The layer 30A has a function of diffusing (or scattering) a light ray incident thereon and passing therethrough. This function is mainly based on a difference between the refractive indexes of the base material 3S and the particles 3P and also depends on parameters such as shapes, sizes, density and/or distributional condition of the particles in the base material. In order to prevent unfavorable coloring caused by interaction, the particles 3P are preferably dispersed randomly within the base material, and shapes and sizes of the particles are preferably irregular to some extent. Both the base material 3S and the particles 3P may be made of a synthetic resin.

Accordingly, the reflected light ray L2 will be diffused by the step-forming layer 30A, whereby the following advantages are obtained.

That is, the transmitted light ray L1 is usually a light ray from a backlight and usually enters the color filter as a light ray having been diffused by a light-guide plate or the like, whereas the reflected light ray L2 is usually an external light ray except any light rays from a front-light and the external light ray enters the color filter with it being not diffused. In the above-mentioned prior art reference, a surface of the reflective electrode part of the pixel electrode is roughened so as to diffuse the reflected light under consideration for a viewing angle Characteristic or the like. However, the embodiment can perform further diffusion in the step-forming layer 30A without relying on the roughening of the prior art or in addition to the diffusion based on the roughening for the purpose of complement.

In addition, since the step-forming layer 30A can selectively diffuse the reflected light ray L2, it is possible to get a diffusion characteristic suitable for the reflected light ray L2 by optimizing the above-described parameters or the like. For instance, in the case of providing a diffusion film extending over an entire display area of the outer face of the display panel, the light ray L1, which has already been diffused through the above-described light guide plate or the like, resultantly becomes excessively diffused, so that an unfavorable situation would occur in that transmittance and contrast are lowered in a transmissive mode. The embodiment can also address such an unfavorable situation.

It should be noted that a resin layer having such diffusion performance and the construction thereof are described in more detail in Japanese Patent Application Laid-open No. 2000-330106, which is utilized for guidance to realize them.

[Embodiment 3]

In the first and second embodiments, there was described the examples where the surface of the coloring layer 1C is sufficiently flattened. If the surface of the coloring layer 1C is flat, planes of incidence for light rays on the surface is uniformly flattened within a pixel. This leads to advantages in respect of optical performance for coloring effect or the other respects.

However, actually in order to make the surface of the coloring layer 1C to be flat, an entire thickness of the coloring layer 1C has to be considerably large or has to be formed using a special material for the coloring layer 1C. The first region 10t forms a recess-shaped portion defined by a pattern of the transparent resin layer 30 and a step (or difference in level) is made on a face on which the coloring layer 1C is deposited so as to correspond to the first region 10t. So, if the coloring layer 1C is deposited on the face and then treated for finishing (cured or the like) through a conventional process, the coloring layer portion of the first region 10t becomes concave as shown in FIG. 5.

To prevent the coloring layer from being formed to have such a concave shape, the coloring layer is to be deposited sufficiently thick so as not to become concave in the finishing. However, under consideration for getting the desired coloring effect of the color filter, the coloring layer 1C should not be formed much thicker only for the purpose of preventing the coloring layer from becoming recessed. Furthermore, although a material capable of preventing the coloring layer 1C from becoming concave in the first region 10t can also be employed for the coloring layer to overcome that, it leads to an unfavorable situation where a special material has to be prepared only for the usual coloring layer 1C.

Figure 5:
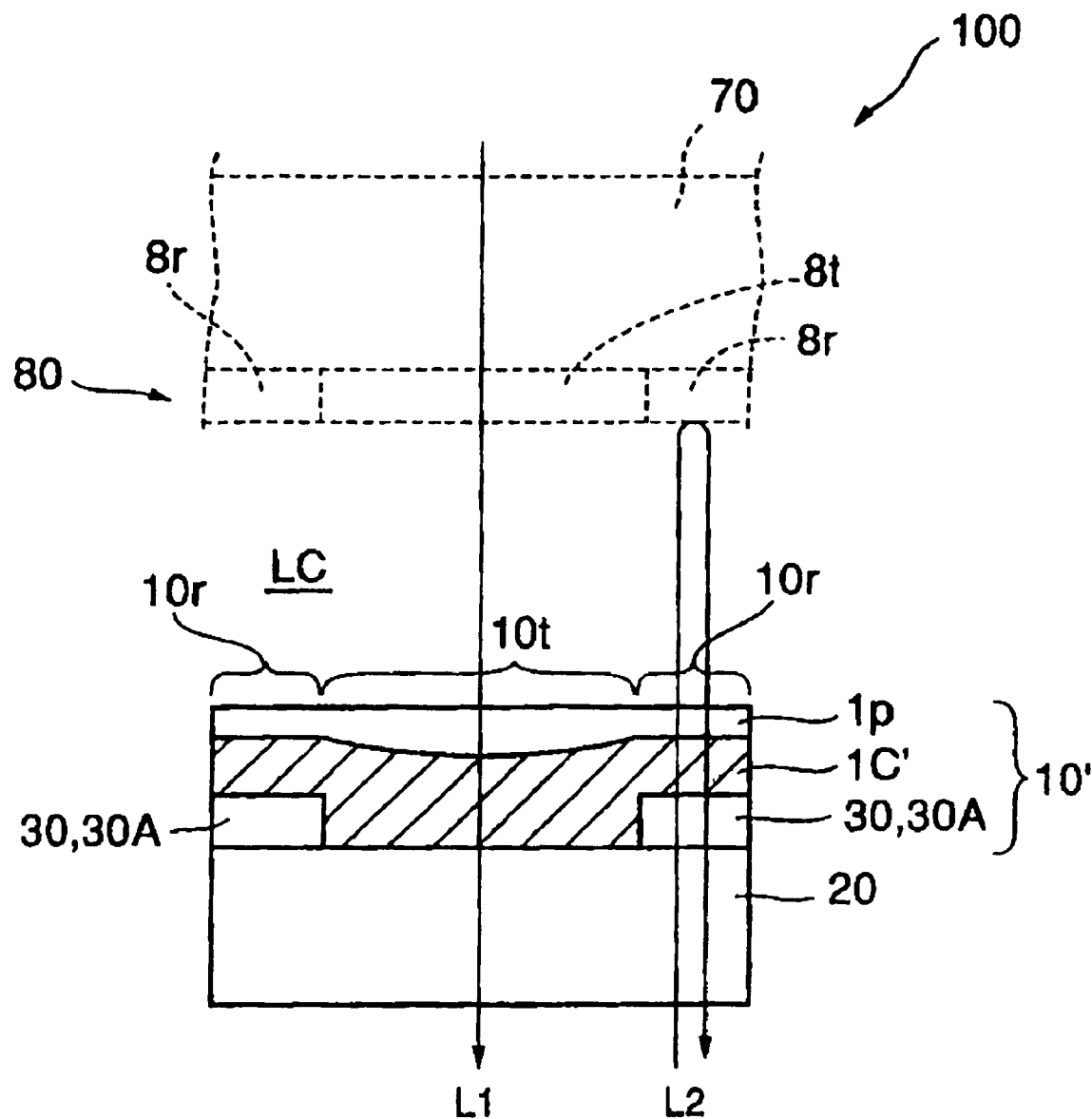
FIG. 5 is a general cross sectional view of a color filter according to the third embodiment of the present invention.

For these reasons, a second embodiment is intended to have the steps of forming a coloring layer 1C' having a desired film thickness but keeping a concave shape as shown in FIG. 5 and then curing it, and subsequently applying a transparent resin to the coloring layer 1C' to form an overcoat layer 1p as a flattening layer. With this construction, the recess of the coloring layer 1C' in the first region 10t is filled with the transparent resin material. As a result, a surface of a pixel area part 10' of the color filter or an entire surface of the color filter is flattened as shown in FIG. 5. As the added overcoat layer 1p is optically transparent, it never affects the coloring performance of the coloring layer.

Accordingly, the provision of the overcoat layer 1p makes the surface of the color filter to be flattened thereby to make the planes of incidence to be more uniform, which reduces an unexpected light leakage possibly caused by the concave shape, thereby greatly contributing to improvement of the optical performance for the coloring effect.

Furthermore, even in the case where the other layer such as an alignment layer (not shown) is formed on the color filter, the coloring layer 1C' never comes in direct contact with the other layer, so that the liquid crystal layer can be advantageously free from contamination, for example. Moreover, since the surface of the color filter is made flattened, fluctuations of alignment in the alignment layer and liquid crystal layer LC respectively disposed on and above the color filter can be prevented.

In the above-mentioned embodiments, there were examples in which the pixel area part 10 corresponding to a pixel in the color filter is partitioned into two regions, i.e., the circular first region 10t for transmission and the second region 10r for reflection surrounding the region lot. However, the present invention is not necessarily limited to those examples. Such sub-regions may be three or more regions and the divisional areas may be designed in any shape, any layout and any number.

Fundamentally, the transmissive region and the reflective region of the color filter correspond to regions (in the cited embodiments, the transmissive part and the reflective part formed in the pixel electrode, respectively) that are assigned to the first light ray and the second light ray, respectively, the light rays being handled by the display device, and the geometric shape, disposition and the number of the transmissive and reflective regions are designed to coincide with those of the assigned regions. Therefore, instead of the circular first region 10t and the second region 10r surrounding the first region as shown in the foregoing embodiments, the first region may be shaped like a rectangle, generally shaped like a rectangle with four corners being rounded (including an ellipse) or shaped like a polygon enclosed with five or more line segments. Note that the recess-shaped portion of the step-forming layer 30, 30A may be preferably configured to have a shape having at least a part of an outline of a polygon with greater interior angles or a curved line with a greater radius of curvature. Such geometric configuration is advantageous for forming the desired pattern accurately. This point becomes more important as the display device is intended to have a screen composed of finer pixels.

Figure 6:
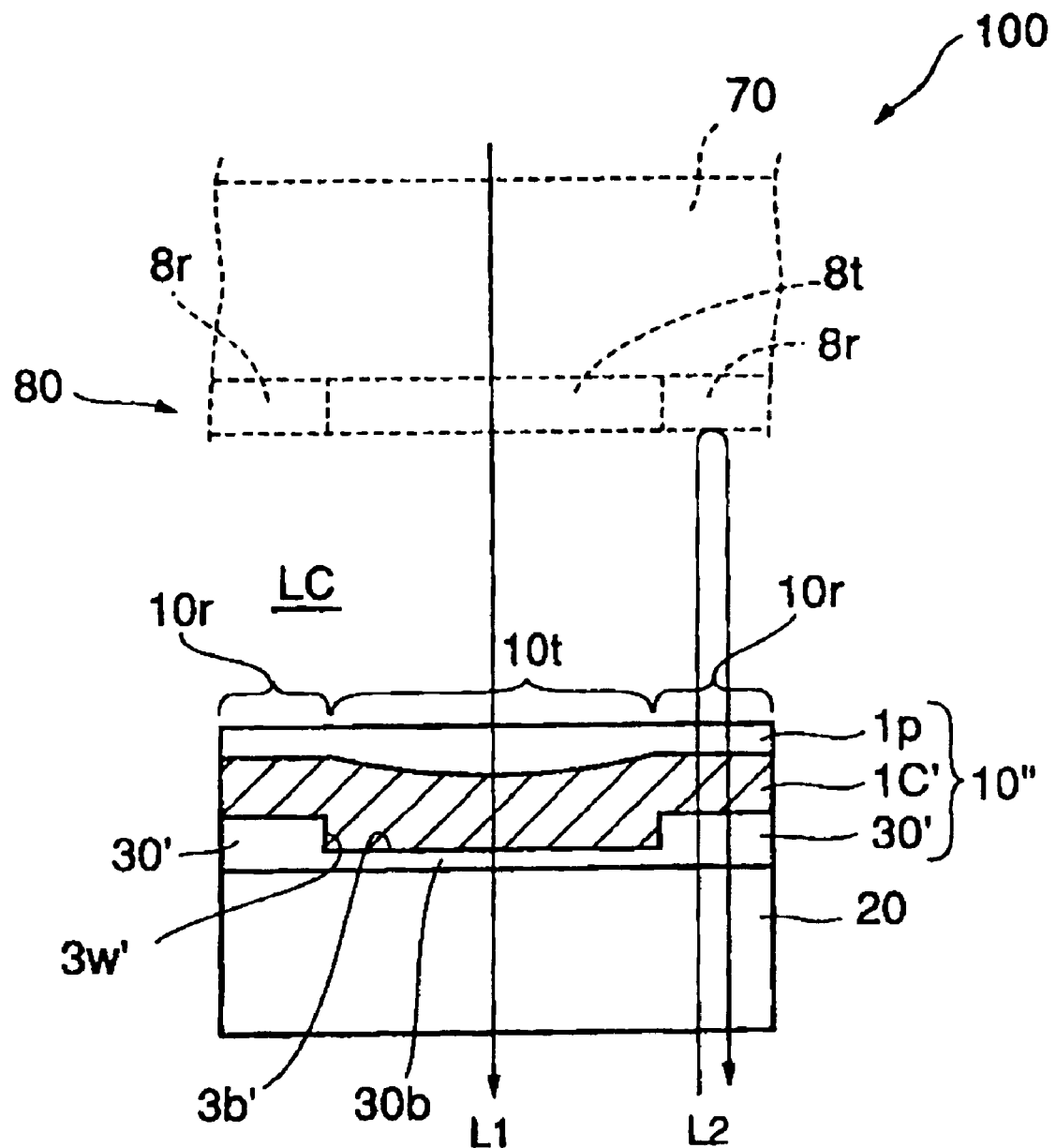
FIG. 6 is a general cross sectional view of a color filter according to the fourth embodiment of the present invention.
Figure 7:
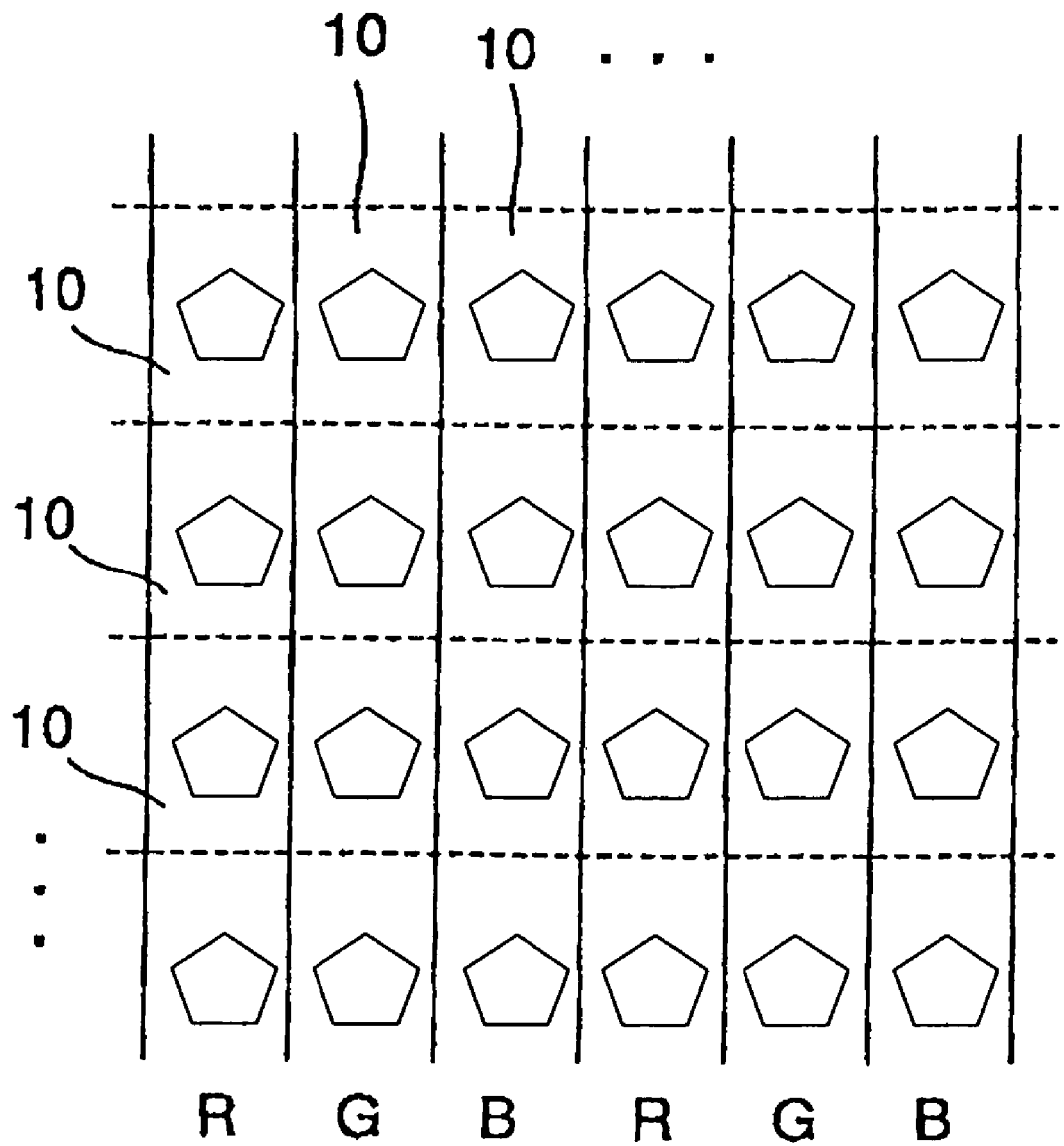
FIG. 7 is a general plan view of a color filter employed in a liguid crystal display device according to a second embodiment of the present invention.

Needless to say, further various modifications may be made in the invention. For example, the pixel area part may be not necessarily formed in cross stripes pattern as shown in FIG. 1. Furthermore, the recess-shaped portion formed in the transparent resin layer 30, 30A is a perfect opening or aperture that causes the support layer for the layer 30, 30A i.e. the substrate 20 to be exposed and the bottom surface of the recess-shaped portion is the surface of the substrate 20. However, as shown in FIG. 6, a step-forming layer 30' having a wall surface 3w' around the recess-shaped portion may be formed based on a lower part transparent resin layer 30b that has a bottom face formed thinner from the same material as that of the step-forming layer 30'. Additionally, although the foregoing embodiments employ the color filter formed directly on the substrate 20, some foundational layer may be inserted between the substrate 20 and the color filter. That is, the present invention is directed to a color filter capable of being supported by a base layer implying such foundational layer and substrate.

Moreover, instead of the transparent resin layer of complete colorlessness and transparence, a resin layer capable of coloring may be employed for some purposes. Additionally, although the foregoing embodiments employ a color filter for three primary colors, R, G and B so as to display full-color images, the present invention is applicable to a color filter for a single color used to display monochrome images. Furthermore, additional elements such as a black matrix, which are required at wish depending on a display system, have not been explained in the foregoing embodiments, but it will be apparent that such elements are not excluded in the present invention.

The preferred embodiments described herein are therefore illustrative and not restrictive, the scope of the invention being indicated by the appended claims, and all variations which come within the meaning of the claims are intended to be embraced therein.

What is claimed is:

1. A color filter for coloring a first light ray having a unidirectional optical path and a second light ray having a bidirectional optical path for each pixel, comprising:
   an optically transmissive layer formed on a first substrate, including,
      a lower layer, and
      a step-forming layer disposed on the lower layer, wherein the step-forming layer has formed therein a recess corresponding to a pixel, and has a wall face surrounding the recess, the recess extending down to the lower layer and having a predetermined shape corresponding to an area wherein the first light ray is caused to be transmitted; and
      a coloring layer disposed on the step-forming layer and in the recess on the lower layer for coloring the first and second light rays.

2. A color filter as defined in claim 1, wherein a thickness of the coloring layer's portion corresponding to the recess in the step-forming layer is greater than that of the remainder of the coloring layer.

3. A color filter as defined in claim 1, wherein the coloring layer's portion corresponding to the recess in the step-forming layer has a thickness that is twice as great as a thickness of the remainder of the coloring layer.

4. A color filter as defined in claim 1, wherein the step-forming layer is colorless and transparent.

5. A color filter as defined in claim 1, wherein the step-forming layer is formed from a synthetic resin.

6. A color filter as defined in claim 1, wherein the color filter further comprises a flattening layer of optically transmissive material which is deposited on at least an area of the coloring layer corresponding to the recess in the step-forming layer.

7. A color filter as defined in claim 6, wherein the flattening layer is colorless and transparent.

8. A color filter as defined in claim 6, wherein the flattening layer is formed from a synthetic resin.

9. A color filter as defined in any one of claim 1, wherein the recess has at least in part a rounded shape on a plan view.

10. A color filter as defined in any one of claim 1, wherein the recess has substantially a circle shape or substantially a shape of polygon that is enclosed with 5 or more line segments on a plan view.

11. A color filter as defined in claim 1, wherein the step-forming layer includes an optically transmissive base material and multiple particles of optically transmissive material having a refractive index different from a refractive index of the base material and being scatteringly mixed into the base material.

12. A color filter as defined in claim 11, wherein the base material and particles consist of synthetic resins.

13. A liquid crystal display device using a color filter as defined in claim 1.

14. A liquid crystal display device as defined in claim 13, wherein:
   the color filter is provided to the first substrate of the liquid crystal display device;
   a second substrate is provided with a pixel electrode comprising a transmissive electrode part for making the first light ray to be transmitted therethrough and a reflective electrode part for making the second light ray to be reflected therefrom; and
   an area of the bottom face in the color filter is aligned with the transmissive electrode part and the other area in the color filter is aligned with the reflective electrode part.

15. The color filter of claim 1, wherein the coloring layer has a concave surface, and wherein the color filter further comprises a flattening layer of optically transmissive material which is deposited on the color filter, including at least on the concave surface.

16. A method of manufacturing a color filter for coloring a first light ray having a unidirectional optical path and a second light ray having a bidirectional optical path for each pixel, comprising the steps of:
   depositing an optically transmissive material on a base layer;
   patterning the deposited layer of optically transmissive material to form a lower layer and a step-forming layer disposed on the lower layer, wherein at least one recess-shaped portion for a pixel is formed in the step-forming layer, the recess-shaped portion having a predetermined shape corresponding to an area wherein the first light ray is caused to be transmitted and a wall face of a predetermined height; and depositing a material for coloring the first and second light rays on the step-forming layer and in the recess so as to form a coloring layer.

17. A method as defined in claim 16, wherein the method further comprises the step of depositing a second optically transmissive material on at least an area of the material for coloring the first and second light rays corresponding to the recess in the step-forming layer so as to form a flattening layer.

18. A method of manufacturing a liquid crystal display device, comprising the steps included in a method as defined in claim 16, wherein the color filter is provided to one substrate of the liquid crystal display device and the other substrate is provided with a pixel electrode comprising a transmissive electrode part for making the first light ray to be transmitted therethrough and a reflective electrode part for making the second light ray to be reflected therefrom, the display device manufacturing method further comprising the step of aligning an area of the bottom face in the color filter with the transmissive electrode part and aligning the other area in the color filter with the reflective electrode part.

19. A color filter for coloring a first light ray having a unidirectional optical path and a second light ray having a bidirectional optical path for each pixel, comprising:

a first coloring portion for coloring the first light ray; and a second coloring portion for coloring the second light ray, wherein a thickness of the first coloring portion is twice a thickness of the second coloring portion, and wherein the first coloring portion has a concave surface, and wherein the color filter further comprises a flattening layer of optically transmissive material which is deposited on the color filter, including at least on the concave surface.

20. A color filter as defined in claim 19, wherein the first coloring portion has at least in part a rounded shape on a plan view.

21. A color filter as defined in claim 19, wherein first coloring portion has substantially a circle shape or substantially a shape of polygon that is enclosed with 5 or more line segments on a plan view.

* * * * *